United States Patent Office 3,801,586
Patented Apr. 2, 1974

3,801,586
PESTICIDAL 3-PHOSPHORYLATED 1,2,4-
THIADIAZOLE DERIVATIVES
Michael D. Barker, Maidstone, Jack Wood, Sittingbourne, and Edward N. Binnie, Faversham, England, assignors to Shell Oil Company, New York, N.Y.
No Drawing. Filed July 6, 1972, Ser. No. 269,342
Claims priority, application Great Britain, July 27, 1971, 35,214/71
Int. Cl. C07d 71/60
U.S. Cl. 260—302 E                3 Claims

ABSTRACT OF THE DISCLOSURE

Novel pesticidal 3-phosphorylated 1,2,4-thiadiazole derivatives.

Field of the invention

This invention relates to the use as pesticides of novel 1,2,4-thiadiazole derivatives phosphorylated at the 3-position of the ring.

Description of the prior art

Belgian Pat. 652,050 describes phosphorylated 1,2,4-thiadiazoles and British Pat. 1,167,785 described certain phosphorylated 1,2,5-thiadiazoles having insecticidal activity.

Description of preferred embodiments

The present invention provides 3-phosphorylated 1,2,4-thiadiazole derivatives of the general formula:

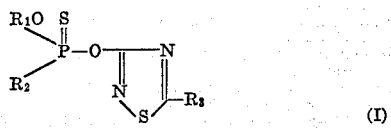

(I)

wherein $R_1$ is alkyl; $R_2$ is alkyl, alkoxy or dialkylamino; and $R_3$ is phenyl optionally substituted by halogen, nitro, alkyl or alkoxy.

Preferred derivatives of this class are those wherein $R_1$ is straight-chain or branched-chain alkyl of 1–6 carbon atoms, for example, methyl, ethyl, isopropyl or butyl; $R_2$ is alkyl, alkoxy or dialkylamino in which each alkyl contains from 1 to 6 carbon atoms, for example ethyl, methoxy, ethoxy or dimethylamino; and $R_3$ is phenyl optionally substituted by chloro or nitro or by alkyl or alkoxy of 1–6 carbon atoms, for example, methyl or methoxy.

A particularly preferred compound is 3-(dimethoxyphosphinothioyloxy)-5-phenyl-1,2,4-thiadiazole.

The compounds of the invention are prepared by a process which comprises reacting a salt, suitably an alkali metal salt, such as the sodium or potassium salt, of a 3-hydroxy-1,2,4-thiadiazole derivative of the formula:

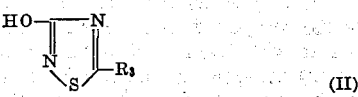

(II)

with a halo compound of the formula:

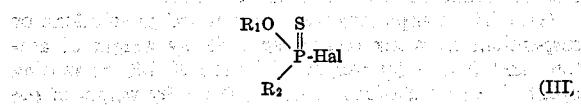

(III)

wherein Hal represents a halogen, suitably chlorine, atom. The reaction is preferably carried out in a polar solvent, for example, a ketone such as acetone or methyl isobutyl ketone, or a substituted amide such as dimethyl formamide.

The compounds of the invention exhibit activity against a wide spectrum of insect and arachnid pests, while at the same time having a relatively low toxicity to mammals. The invention includes therefore within its scope pesticidal compositions comprising a carrier and/or a surface-active agent together with, as active ingredient, at least one 3-phosphorylated 1,2,4-thiadiazole of the invention. Likewise the invention includes also a method of combatting insect and/or arachnid pests at a locus which comprises applying to the locus a pesticidally effective amount of a 3-phosphorylated 1,2,4-thiadiazole derivative or composition according to the invention.

The term "carrier" as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the materials usually applied in formulating pesticides, herbicides or fungicides may be used as carrier.

Suitable solid carriers are natural and synthetic clays and silicates for example, natural silicas such as diatomacious earths; magnesium silicates, for example, talcs; magnesium aluminum silicates, for example, attapulgites and vericulites; aluminum silicates, for example, kaolinites, montorillonites and micas; calcium carbonates; calcium sulphate; synthetic hydrated silicon oxides and synthetic calcium or aluminum silicates; elements such as for example, carbon and sulphur; natural and synthetic resins such as, for example, coumarone resins, polyvinyl chloride and styrene polymers and copolymers; solid polychlorophenols; bitumen; waxes such as for example, beeswax, paraffin wax, and chlorinated mineral waxes; and solid fertilizers, for example superphosphates.

Examples of suitable fluid carriers are water, alcohols, such as for example, isopropanol, glycols; ketones such as for example, acetone, methyl ethyl ketone, methyl isobutyl ketone and cyclohexanone; ethers; aromatic hydrocarbons such as for example, benzene, toluene and xylene; petroleum fractions such as for example kerosene, light mineral oils, chlorinated hydrocarbons, such as for example, carbon tetrachloride, perchloroethylene, trichloroethane, including liquified normally vaporous gaseous compounds. Mixtures of different liquids are often suitable.

The surface-active agent may be an emulsifying agent or a dispersing agent or a wetting agent; it may be nonionic or ionic. Any of the surface-active agents usually applied in formulating pesticides, herbicides or fungicides may be used. Examples of suitable surface-active agents are the sodium or calcium salts of polyacrylic acids and lignin sulphonic acids; the condensation products of fatty acids or aliphatic amines or amides containing at least 12 carbon atoms in the molecule with ethylene oxide and/or propylene oxide; faty acid esters of glycerol, sorbitan, sucrose or pentaerythritol; condensates of these with ethylene oxide and/or propylene oxide; condensation products of fatty alcohols or alkyl phenols for example, p-octylphenol or p-octylcresol, with ethylene oxide and/ or propylene oxide; sulphates or sulphonates of these condensation products; alkali or alkaline earth metal salts, preferably sodium salts, of sulphuric or sulphonic acid esters containing at least 10 carbon atoms in the molecule, for example, sodium lauryl sulphate, sodium secondary alkyl sulphates, sodium salts of sulphonated castor oil, and sodium alkylaryl sulphonates such as sodium dodecylbenzene sulphonate; and polymers of ethylene oxide and copolymers of ethylene oxide and propylene oxide.

The compositions of the invention may be formulated as wettable powders, dusts, granules, solutions, emulsifiable concentrates, emulsions, suspension concentrates and aerosols. Wettable powders are usually compounded to contain 25, 50 or 75% w. of toxicant and usually contain, in addition to solid carrier, 3–10% w. of a dispersing agent and, where necessary, 0–10% w. of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% w. of toxicant. Granules are usually prepared to have a size between 10 and 100 BS mesh (1.676–0.152 mm.), and may be manufactured by agglomeration or impregnation techniques. Generally, granules will contain ½–25% w. toxicant and 0–10% w. of additives such as stabilizers, slow release modifiers and binding agents. Emulsifiable concentrates usually contain, in addition to the solvent and, when necessary, co-solvent, 10–50% w./v. toxicant, 2–20% w./v. emulsifiers and 0–20% w./v. of appropriate additives such as stabilizers, penetrants and corrosion inhibitors. Suspension concentrates are compounded so as to obtain a stable, non-sedimenting flowable product and usually contain 10–75% w. toxicant, 0–5% w. of dispersing agents, 0.1–10% w. of suspending agents such as protective colloids and thixotropic agents, 0–10% w. of appropriate additives such as defoamers, corrosion inhibitors, stabilizers, penetrants and stickers, and as carrier, water or an organic liquid in which the toxicant is substantially insoluble; certain organic solids or inorganic salts may be dissolved in the carrier to assist in preventing sedimentation or as antifreeze agents for water.

Aqueous dispersions and emulsions, for example, compositions obtained by diluting a wettable powder or an emulsifiable concentrate according to the invention with water, also lie within the scope of the present invention. The said emulsions may be of the water-in-oil or of the oil-in-water type, and may have a thick "mayonnaise"-like consistency.

The compositions of the invention may also contain other ingredients, for example, other compounds possessing pesticidal, herbicidal or fungicidal properties.

The invention is further illustrated in the following examples. In these examples, "parts" means parts by weight unless otherwise expressly indicated, with parts by weight having the same relationship to parts by volume as does the kilogram to the liter. In each example, the product was identified by analyses.

EXAMPLE 1

3-(diethoxyphosphinothioyloxy)-5-phenyl-1,2,4-thiadiazole

Diethyl phosphorochloridothionate (5.7 parts) and the sodium salt of 3-hydroxy-5-phenyl-1,2,4-thiadiazole (6.0 parts) in dry acetone (80 parts by volume) were stirred together and heated under reflux for 16 hours. The solvent was removed under reduced pressure and the residue was dissolved in ether. The ethereal solution was washed three times with water, dried (MgSO$_4$) and the ether removed under reduced pressure. The residual oil was purified by chromatography on silica gel using 2% acetone in hexane as eluant to give the desired product as an oil, index refraction, $n_D^{21}$=1.5718.

EXAMPLE 2

3-(dimethoxyphosphinothioyloxy)-5-phenyl-1,2,4-thiadiazole 3-hydroxy-5-phenyl-1,2,4-thiadiazole (44.5 parts) and anhydrous potassium carbonate (34.5 parts) in dry methyl isobutyl ketone (500 parts by volume) were stirred together at room temperature. Dimethyl phosphorochloridothionate (45 parts) was added and the mixture was heated at 60–70° C. for 20 hours. The cooled mixture was filtered and the solvent was removed from the filtrate under reduced pressure. The residue was purified by chromatography on silica gel using 3% acetone in hexane as eluant to give the desired product as an oil, index of refraction $n_D^{19}$=1.5938.

EXAMPLE 3

3-(dimethylaminoethoxyphosphinothioyloxy)-5-(4-chlorophenyl)-1,2,4-thiadiazole

Ethyl N,N - dimethylphosphoramidochloridothionate (4.1 parts) and the sodium salt of 3-hydroxy-5-(4-chlorophenyl) - 1,2,4-thiadiazole (4.7 parts) in anhydrous dimethylformamide (150 parts by volume) were stirred together at 80–90° C. for 2 hours. The reaction mixture was then poured into water and extracted with ether. The extracts were washed in turn with water, dilute aqueous sodium bicarbonate solution and water, and dried (MgSO$_4$). The ether was removed under reduced pressure and the residue purified by chromatography on silica gel using 3% acetone in petroleum ether as eluant, followed by recrystallization from aqueous ethanol to give the desired product, melting point, 66° C.

EXAMPLE 4

Following procedures similar to those described in Examples 1–3 further compounds were prepared, whose physical characteristics and analyses are given in Table I.

TABLE I

| Compound | Refractive index or M.P. °C. |
| --- | --- |
| 3-(isopropoxymethoxyphosphinothioyloxy)-5-phenyl-1,2,4-thiadiazole. | $n_D^{21}$ 1.5620 |
| 3-(ethoxymethoxyphosphinothioyloxy)-5-phenyl-1,2,4-thiadiazole. | $n_D^{20}$ 1.5835 |
| 3-(ethoxyethylphosphinothioyloxy)-5-phenyl-1,2,4-thiadiazole. | $n_D^{20}$ 1.5905 |
| 3-(butoxymethoxyphosphinothioyloxy)-5-phenyl-1,2,4-thiadizaole. | $n_D^{21}$ 1.5672 |
| 3-(dimethoxyphosphinothioyloxy)-5-p-tolyl-1,2,4-thiadiazole | $n_D^{19}$ 1.5940 |
| 3-(diethoxyphosphinothioyloxy)-5-(4-chlorophenyl)-1,2,4-thiadiazole. | $n_D^{20}$ 1.5841 |
| 3-(diethoxyphosphinothioyloxy)-5-(4-methoxyphenyl)-1,2,4-thiadiazole. | M.P. 74–76 |
| 3-(diethoxyphosphinothioyloxy)-5-(3-nitrophenyl)-1,2,4-thiadiazole. | $n_D^{20}$ 1.5871 |
| 3-(dimethylaminomethoxyphosphinothioyloxy)-5-(4-chlorophenyl)-1,2,4-thiadiazole. | M.P. 93–95 |
| 3-(dimethylaminoethoxyphosphinothioyloxy)-5-phenyl-1,2,4-thiadiazole. | $n_D^{22}$ 1.5870 |

EXAMPLE 5

Insecticidal and acaricidal activity

The insecticidal and acaricidal activity of the compounds of the invention was tested as follows:

(I) A 0.1% by weight solution in acetone of the compound to be tested was prepared, and taken up in a micrometer syringe. Two to three-day old adult female house flies (*Musca domestica*) were anaesthetized with carbon dioxide, and 1µ. l. drop of the test solution was brushed off on the ventral abdomen of each, 20 flies being treated. The treated flies were held for 24 hours in glass jars, each containing a little granulated sugar as food for the flies, and the percentage of dead and moribund individuals was then recorded.

(II) A quantity of 0.1 ml. of a 0.1% by weight solution of the compound to be tested in acetone was mixed in a beaker with 100 ml. of water. Twenty 5–6 day-old (4th instar) mosquito larvae (*Aedes aegypti*) were added and the beakers stored for 24 hours. The percentage of dead and moribund larvae was then recorded.

(III) The compounds were formulated as solutions or suspensions in water containing 20% by weight of acetone and 0.05% by weight of Triton X-100 as wetting agent. The formulations contained 0.2% by weight of the compound to be tested. Turnip and broad bean plants, trimmed to one leaf each, were sprayed on the under surface of the leaf with the above formulation. Spraying was effected with a spraying machine delivering 450 litres per hectare, the plants passing under the spray on a moving belt. Ten 4th instar (8-day-old) diamond-back moth larvae (*Plutella maculipennis*) or ten adult 1–2 week-old mustart beetles (*Phaedon cochleariae*) were placed on the sprayed leaf of each turnip plant and ten apterous (6-day-old) vetch aphids (*Megoura viciae*) were placed on the sprayed leaf of each broad bean plant. The plants were then enclosed in glass cylinders fitted at one end with a muslin cap. Mortality counts were made after 24 hours.

(IV) In tests against glass house spider mites (*Tetranychus urticae*), leaf discs cut from French bean plants were sprayed in the manner described under III. 1 hour after spraying, the discs were inoculated with 10 adult mites. Mortality counts were made 24 hours after inoculation.

(V) In tests againts large white butterfly larvae (*Pieris brassicae*), leaf discs cut from cabbage leaves were sprayed in the manner described under III. 10 3rd instar (8–10 day-old) larvae were placed on the discs within petri-dish pairs. Mortality counts were made 24 hours after inoculation.

The results of these tests are given in Table II, in which A denotes complete kill, B some kill and C no kill of the test insects.

We claim as our invention:

1. A compound of the general formula

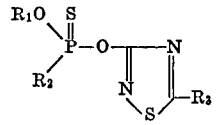

wherein $R_1$ is alkyl of 1–6 carbon atoms; $R_2$ is alkyl, alkoxy or dialkylamino in which each alkyl contains from 1 to 6 carbon atoms; and $R_3$ is phenyl optionally substituted by chloro or nitro or by alkyl or alkoxy or 1–6 carbon atoms.

2. A compound as defined in claim 1 wherein R is methyl, ethyl, isopropyl or butyl; $R_2$ is ethyl, methoxy, ethoxy or dimethylamino; and $R_3$ is phenyl optionally substituted by chloro, nitro, methyl or methoxy.

3. A compound as defined in claim 2 wherein $R_1$ is methyl, $R_2$ is methoxy and $R_3$ is phenyl.

TABLE II

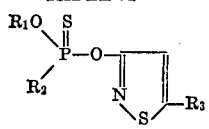

| Compound | | | Pesticidal activity | | | | | | |
|---|---|---|---|---|---|---|---|---|---|
| $R_1$ | $R_2$ | $R_3$ | M. domestica | A. aegypti | P. cochleariae | P. maculipennis | P. brassicae | M. viciae | T. urticae |
| $CH_3$ | $CH_3O$ | $C_6H_5$ | A | A | A | A | A | A | A |
| $C_2H_5$ | $C_2H_5O$ | $C_6H_5$ | A | A | A | A | A | A | A |
| $(CH_3)_2CH$ | $CH_3O$ | $C_6H_5$ | A | A | A | A | A | A | A |
| $C_2H_5$ | $CH_3O$ | $C_6H_5$ | A | A | A | A | A | A | A |
| $C_2H_5$ | $C_2H_5$ | $C_6H_5$ | A | A | A | A | A | A | A |
| $CH_3(CH_2)_3$ | $CH_3$ | $C_6H_5$ | C | A | A | A | A | A | A |
| $CH_3$ | $CH_3O$ | P-Tolyl | C | A | B | B | A | A | A |
| $C_2H_5$ | $C_2H_5O$ | 4-chlorophenyl | A | A | A | A | A | A | A |
| $C_2H_5$ | $C_2H_5O$ | 4-methoxyphenyl | C | A | B | B | A | A | A |
| $C_2H_5$ | $C_2H_5O$ | 3-nitrophenyl | A | A | A | A | A | A | A |

References Cited

UNITED STATES PATENTS 1,915,334   6/1933   Salzberg et al.
2,425,320   8/1947   Hill.

FOREIGN PATENTS 1,167,785   10/1969   Great Britain _____ 260—302 E

RICHARD J. GALLAGHER, Primary Examiner

U.S. Cl. X.R.

260—302 D; 424—200